US011459885B2

(12) United States Patent
Benoit et al.

(10) Patent No.: US 11,459,885 B2
(45) Date of Patent: Oct. 4, 2022

(54) WORKFLOW FOR PREDICTIVE MODEL TO SELECT FORMATION DAMAGE TREATMENT

(71) Applicant: Halliburton Energy Services, Inc., Houston, TX (US)

(72) Inventors: Denise Nicole Benoit, Houston, TX (US); Enrique Antonio Reyes, Tomball, TX (US); Kristina Henkel Holan, Cypress, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 396 days.

(21) Appl. No.: 16/025,861

(22) Filed: Jul. 2, 2018

(65) Prior Publication Data
US 2020/0003052 A1      Jan. 2, 2020

(51) Int. Cl.
*E21B 49/00* (2006.01)
*E21B 49/02* (2006.01)
*C09K 8/62* (2006.01)

(52) U.S. Cl.
CPC ............ *E21B 49/02* (2013.01); *C09K 8/62* (2013.01)

(58) Field of Classification Search
CPC ........ E21B 49/02; E21B 43/16; E21B 43/166; E21B 43/26; C09K 8/62; C09K 2208/22;
(Continued)

(56) References Cited

U.S. PATENT DOCUMENTS 8,392,165 B2 *  3/2013  Craig ..................... E21B 49/00
                                                        703/10
10,302,798 B2   5/2019  Benoit et al.
(Continued)

FOREIGN PATENT DOCUMENTS

| CN | 102720473 A | * | 10/2012 | |
| CN | 105555907 A | * | 5/2016 | ............... C09K 8/60 |
| WO | 2016072989 A1 | | 5/2016 | |

OTHER PUBLICATIONS

Zhang etal, "Micromechanical characterization of fluid/shale interactions by means of nanoindentation", May 2018, SPE Reservoir Evaluation & Engineering (Year: 2018).*

(Continued)

*Primary Examiner* — Kandasamy Thangavelu
(74) *Attorney, Agent, or Firm* — McGuireWoods LLP

(57) ABSTRACT

Provided are methods for selecting a treatment for a subterranean formation in accordance with the disclosure and the illustrated FIGs. An example method comprises obtaining a formation material, measuring a geomechanical property of the formation material, measuring a mineralogy of the formation material, preparing a predictive model for the formation material from the measured geomechanical property and the mineralogy of the formation material; wherein the predictive model analyzes production over time for a plurality of treatments for the formation material, wherein the formation material is treated with each treatment in the plurality of treatments and the geomechanical property and the mineralogy of the formation material are measured before and after an individual treatment, selecting the treatment having the greatest production from the plurality of treatments, and contacting the subterranean formation with the treatment.

20 Claims, 7 Drawing Sheets

(58) Field of Classification Search
CPC .......... C09K 2208/26; C09K 2208/28; C09K 2208/32; C09K 8/60; G01V 1/282
USPC ............................................. 703/10
See application file for complete search history.

(56) References Cited

U.S. PATENT DOCUMENTS

| | | | | |
|---|---|---|---|---|
| 2011/0170373 A1* | 7/2011 | Hsu | ........................ | G01V 1/282 367/73 |
| 2011/0240296 A1* | 10/2011 | Dusterhoft | ............. | C09K 8/665 166/308.1 |
| 2011/0308790 A1* | 12/2011 | Strapoc | .................. | E21B 43/16 166/250.01 |
| 2013/0213657 A1* | 8/2013 | Dobson, Jr. | ............. | E21B 43/26 166/305.1 |
| 2017/0030819 A1* | 2/2017 | McCarty | ................ | C09K 8/605 |
| 2017/0066959 A1* | 3/2017 | Hull | ........................ | C09K 8/665 |
| 2017/0327731 A1* | 11/2017 | Benoit | ..................... | C09K 8/68 |
| 2019/0010795 A1* | 1/2019 | Lo Cascio | ............ | E21B 43/166 |

OTHER PUBLICATIONS

Yang et al, "Micromechanical characterization of fluid/shale interactions by means of nanoindentation", May 2018, SPE Reservoir Evaluation & Engineering (Year: 2018).*
Debson et al., U.S. Patent Application Publication 2013/0213657 A1, Aug. 2013, See the shortened version.*
La Cascio et al., U.S. Patent Application Publication 2019/0010795, Jan. 2019, see the shortened vesion.*
Strapoe et al., U.S. Patent Application Publication 2011/0308790, Dec. 2011., see the shortened vesion.*
Hsu et al., U.S. Patent Application Publication 2011/0170373, Jul. 2011, see the shortened vesion.*
Abedi, Sara, et al. "Nanochemo-mechanical signature of organic-rich shales: a coupled indentation—EDX analysis." Acta Geotechnica 11.3 (2016): 559-572.
Abedi, Sara, Mima Slim, and Franz-Josef Ulm. "Nanomechanics of organic-rich shales: the role of thermal maturity and organic matter content on texture." Acta Geotechnica 11.4 (2016): 775-787.

* cited by examiner

WORKFLOW FOR PREDICTIVE MODEL TO SELECT FORMATION DAMAGE TREATMENT

TECHNICAL FIELD

This disclosure relates, in general, to a workflow process to identify and select a treatment to prevent and/or remedy fluid-induced damage to a subterranean formation.

BACKGROUND

Production of oil and gas is often hampered by formation damage. Formation damage may occur from contact with treatment fluids introduced during wellbore operations. For example, the treatment fluids may induce swelling in the formation and/or migration. Some formation damage may also occur from the treatment fluid being introduced at a high pressure. Moreover, certain formations may be prone to water-sensitivity, which can cause formation damage through swelling, softening, dissolving, forming of precipitates, sloughing, generating migrating fines, or a combination thereof. Formation damage may decrease production as well as induce irreversible wellbore damage in some situations.

In some formations, clays or fines may be present. Further, fines may be generated from contact with a treatment fluid under certain conditions. In certain formations, the clays may swell and/or the fines may migrate through the formation until they become lodged in the pore throats. This can decrease the permeability of the formation. Preventing and/or reducing the formation of fines and/or the swelling of clays may be of benefit during wellbore operations. However, there is great variety in the minerals which comprise a formation as well as in the treatment fluids used during wellbore operations. These minerals may react differently to the various treatment fluids, resulting in some treatment fluids having an increased impact on production.

Predicting which treatment fluid to use to prevent or remedy formation damage is a difficult process. Due to the number of variables and unknowns involved, predicting the best option among many possibilities can be a time-consuming and laborious process. Moreover, the chosen treatment fluid may also affect production over the life of the well. Prediction of the long-term impact on productivity, and not just the immediate effect on the formation, is a challenge not currently addressed in the field.

BRIEF DESCRIPTION OF THE DRAWINGS

Illustrative examples of the present disclosure are described in detail below with reference to the attached drawing figures, which are incorporated by reference herein, and wherein.

Figure 1:
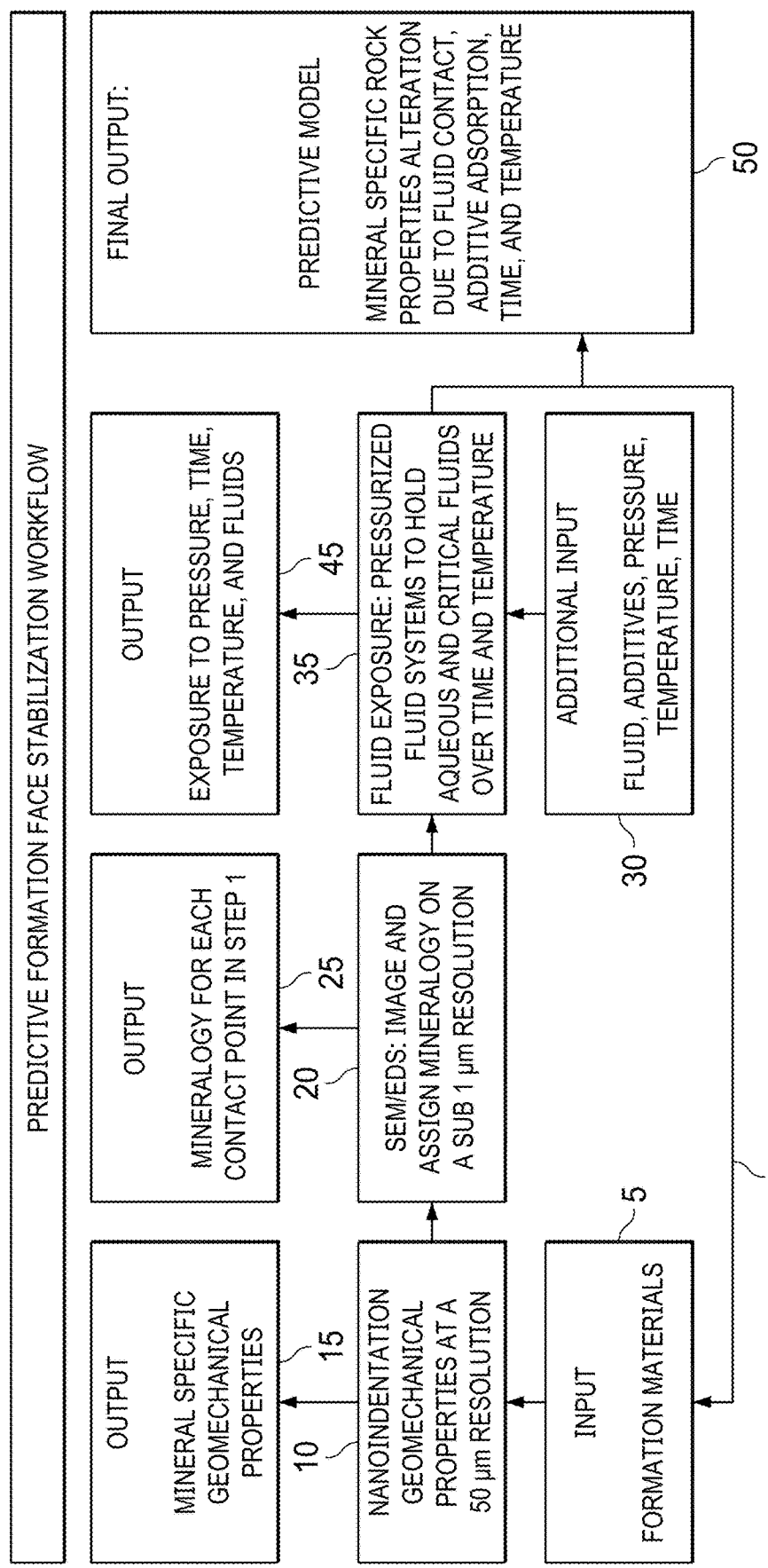
FIG. 1 is an analytical flow diagram illustrating an example workflow to produce a predictive model based on the characterization of mineral specific damage mechanisms in accordance with one or more examples described herein.

The illustrated figures are only exemplary and are not intended to assert or imply any limitation with regard to the environment, architecture, design, or process in which different examples may be implemented.

DETAILED DESCRIPTION

This disclosure relates, in general, to a workflow process to identify and select a treatment to prevent and/or remedy fluid-induced damage to a subterranean formation.

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Unless otherwise specified, any use of any form of the terms "connect," "engage," "couple," "attach," or any other term describing an interaction between elements is not meant to limit the interaction to direct interaction between the elements and may also include indirect interaction between the elements described. Further, any use of any form of the terms "connect," "engage," "couple," "attach," or any other term describing an interaction between elements includes items integrally formed together without the aid of extraneous fasteners or joining devices. In the following discussion and in the claims, the terms "including"

and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

The example methods disclosed herein relate to determining specific treatments to prevent or remedy formation damage during hydraulic fracturing operations. Said determination is made by selection of a specific treatment from among a wide range of possible candidates based on workflows that identify the optimal treatments for protection of the formation based on an analysis of formation materials of a target geological formation. These methods are designed to look for signs of damage that are postulated to affect conductivity and then rank a compound or product's ability to mitigate that specific damage mechanism. The methods identify the specific geomechanical properties and characteristics of the formation minerals as well as identify the species of formation minerals. A predictive model is then developed from this data, and that predictive model may be used to predict the treatment's effect on productivity over time at the reservoir scale. This predictive model may be used to compare several treatments for the target formation. Further, a database of the sampled formations and the impact of the tested treatment fluids on said formations may be constructed. The database may be used to reduce the need for obtaining core or cutting samples and may utilize logging data to provide the desired treatment fluid prediction model when a similar formation is encountered to one which was previously entered into the database.

A geological formation is an aggregate of a predominant type of mineral, for example calcite (CaCO3), or a conglomerate of minerals such as those denominated as shales that may respond to various wellbore or fracturing treatments. The mineral specific fluid response is a factor of the mineral quantity and the mineral's distribution within the framework of the particular formation. A workflow to develop a predictive model for the specific target formation may be developed. The predictive model may be built by measuring the specific fluid response for the conglomerate of minerals that comprise the formation. The fluid response may be measured at present reservoir conditions, and then this fluid response may be scaled to the reservoir scale to make a prediction of how the treatment may impact the formation. The predictive model may consider the effects of the treatment, temperature, and pressure over time. The predictive model may be used to generate a productivity index which may be used to select a preferred treatment for a given formation.

FIG. 1 is an analytical flow diagram illustrating some example workflow steps to produce a predictive model based on the characterization of mineral specific damage mechanisms and which may be used to select a treatment selection based on predicted production uplift.

At box 5, formation materials are collected from the target formation. These materials are solid fragments of the formation and may be cores, cuttings, or outcrops as are obtainable. The cores, cuttings, or outcrops may be obtained in any sufficient manner as would occur to one of ordinary skill in the art. As discussed further below, wellbore logging may also be performed in some operations as desired. Should the logging data confirm that the formation is one that has been encountered previously, a formation database (discussed below) may be used to either access or generate the predictive model from the earlier experimental data regarding the already encountered formation. This may reduce the time needed to ascertain the optimal treatment for the formation.

At box 10, an experimental test to determine the geomechanical properties of the sample is performed. The workflow to build the predictive model includes determining the geomechanical properties of the minerals comprising the formation as they are distributed within the formation matrix. As used herein, "geomechanical" refers to properties of rocks and the behavior of those properties as the rock undergoes physical interactions (e.g., from stress, temperature, pressure, time, etc.). Specific examples of geomechanical properties include, but are not limited to, mineral hardness, Young's modulus, Poisson's ratio, fracture toughness, tensile strength, minimum horizontal stress, shear modulus, and the bulk modulus.

As an example, box 10 illustrates using a nanoindentation method to determine the geomechanical properties of the sample at about 4 to about 50 μm resolution. In preferred examples, the mineral hardness, Young's modulus, and Poisson's ratio may be determined at this resolution. Instrumented grid nanoindentation is one example of a test to measure the geomechanical properties of the formation samples. Nanoindentation may be used to characterize the mechanical behavior of a heterogeneous material at submicrometer length scales. Each test comprises impinging an indenter tip of known geometry and mechanical properties onto the surface of the material of interest, and the mechanical properties of the indented bulk material are extracted from the force-displacement curve by applying a continuum scale model to obtain the indentation modulus M and the indentation hardness H (as illustrated in FIG. 2 discussed below).

Figure 2:
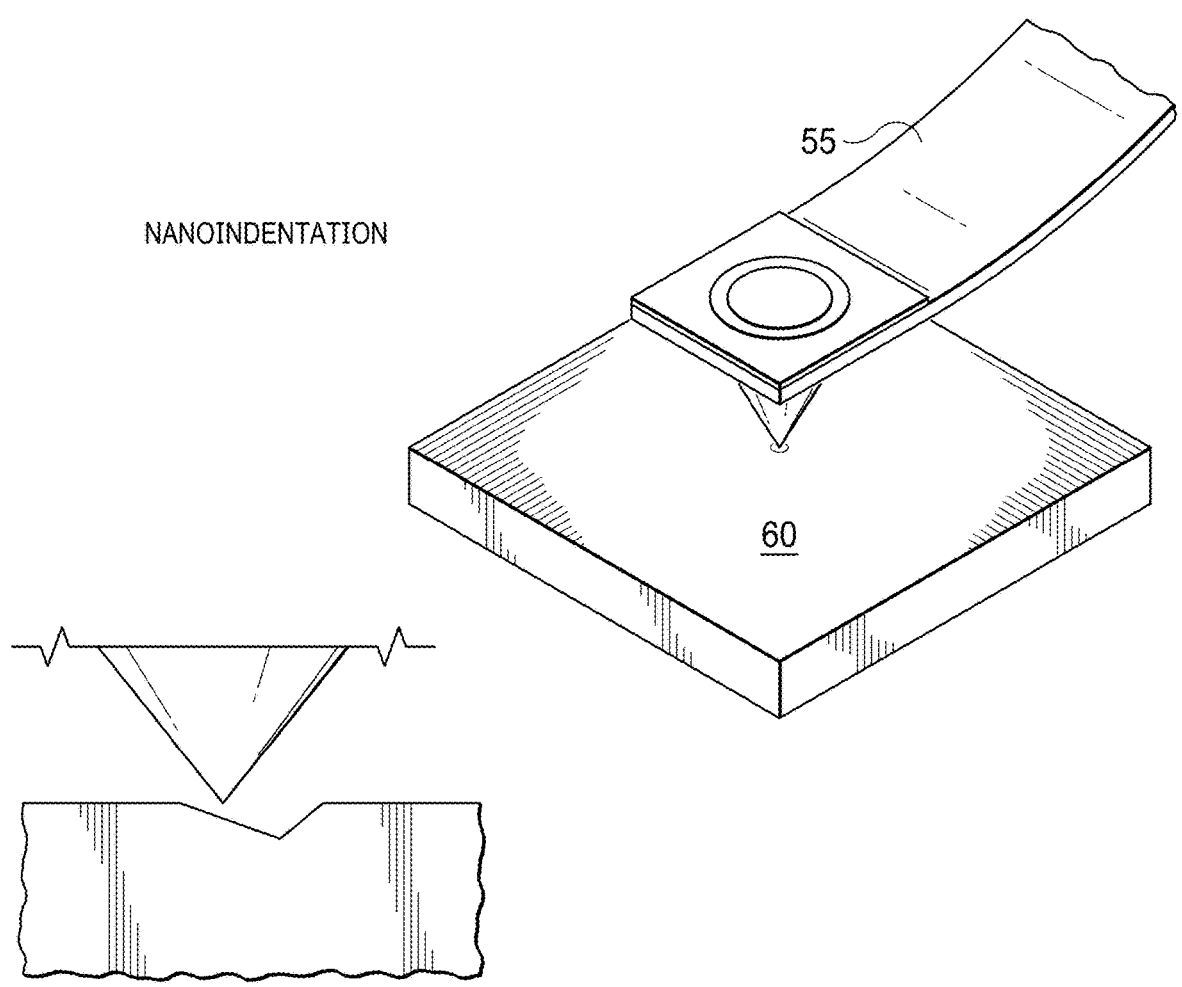
FIG. 2 is a diagram of a nanoindentation process in accordance with one or more examples described herein.
Figure 2:
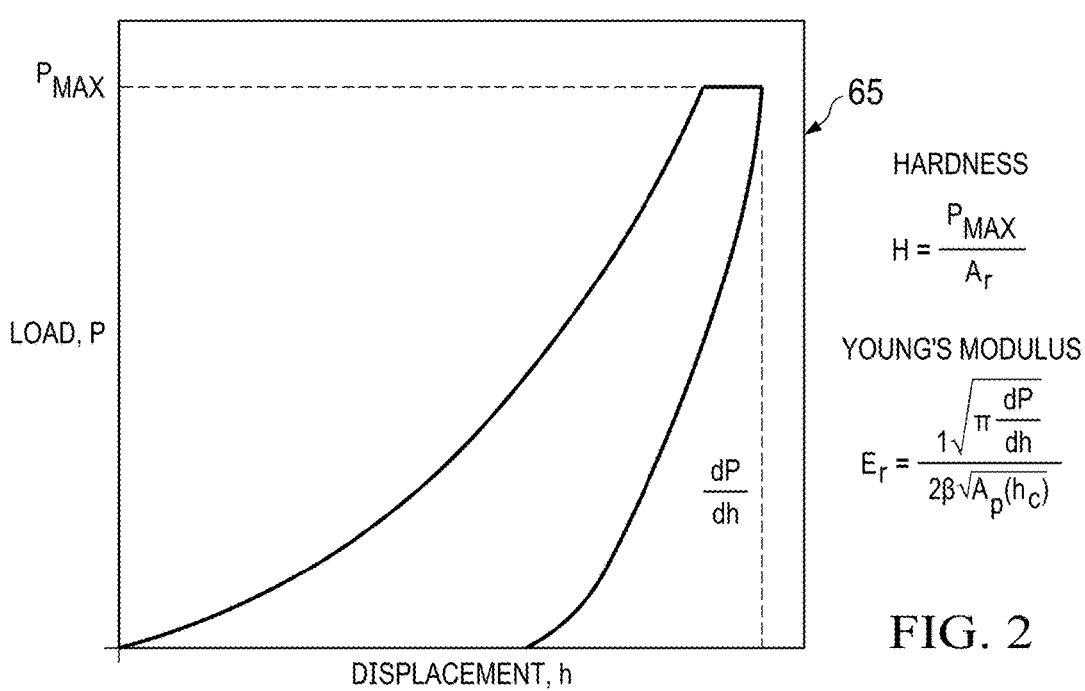

Referring now to FIG. 2, an instructive diagram of nanoindentation is illustrated. The indenter 55 may comprise a hard tip 60 with a known geometry. The testing process may be used to obtain data about the geomechanical properties of the sample. For example, the harness may be calculated from the following equation:

$$H = \frac{P_{max}}{A_r} \qquad \text{(Eq. 1)}$$

where H is the harness, Pmax is the maximum load, and Ar is the residual indentation area. Likewise, the Young's modulus may also be calculated from nanoindentation, for example, by using the following equation:

$$Er = \frac{1\sqrt{\pi}\frac{dP}{dh}}{2\beta\sqrt{A_p(h_c)}} \qquad \text{(Eq. 2)}$$

where Er is the Young's modulus, dP/dh is the slope of the curve (as illustrated in the load-displacement curve 65) of FIG. 2, $\beta$ is a geometrical constant, and $A_p(h_c)$ is the projected area of the indentation at the contact depth $h_c$.

Although nanoindentation is illustrated as the geomechanical test for box 10, it is to be understood that any sufficient geomechanical test for gathering the desired geomechanical data may be used. Examples of alternative test methods may include, but are not limited to, brinelle hardness, Young's modulus, Poison's ratio, Brazilian hardness, tensile tests, triaxial or uniaxial tests, compressive strength, fracture toughness, ultrasonic velocities, proppant embedment, impact hammer tests, crush tests, and any combination thereof.

Referring again to FIG. 1, box 15 illustrates the data output from the geomechanical test. The geomechanical data is mineral specific and as such should be specific to each mineral within the formation as it is distributed within the formation matrix. For example, at box 15 the mineral hardness, Young's modulus, and Poisson's ratio data may be output for development of the predictive model.

Box 20 illustrates an example mineralogy test to determine the mineralogy of the formation for each contact point of the geomechanical test performed in step 10. The example mineralogy test performed at box 20 is scanning electron microscopy (hereafter "SEM") coupled with energy dispersive x-ray spectroscopy (hereafter "EDX") at the sub 1 μm resolution. EDX may be employed to determine the elemental analysis of formation samples. EDX utilizes the X-ray spectrum emitted from the incited solid formation materials as a result of a beam of electrons bombarding the sample surface to provide a localized chemical analysis. The emitted X-rays are classified based on their energy, and the excited material volume depends on the electron beam energy and material density. The samples are analyzed over the same area on which the geomechanical test is performed (e.g., the indentation spots of the nanoindentation test), and the intensities are averaged around the testing spots to provide a unique elemental composition for each testing spot.

Figure 3:
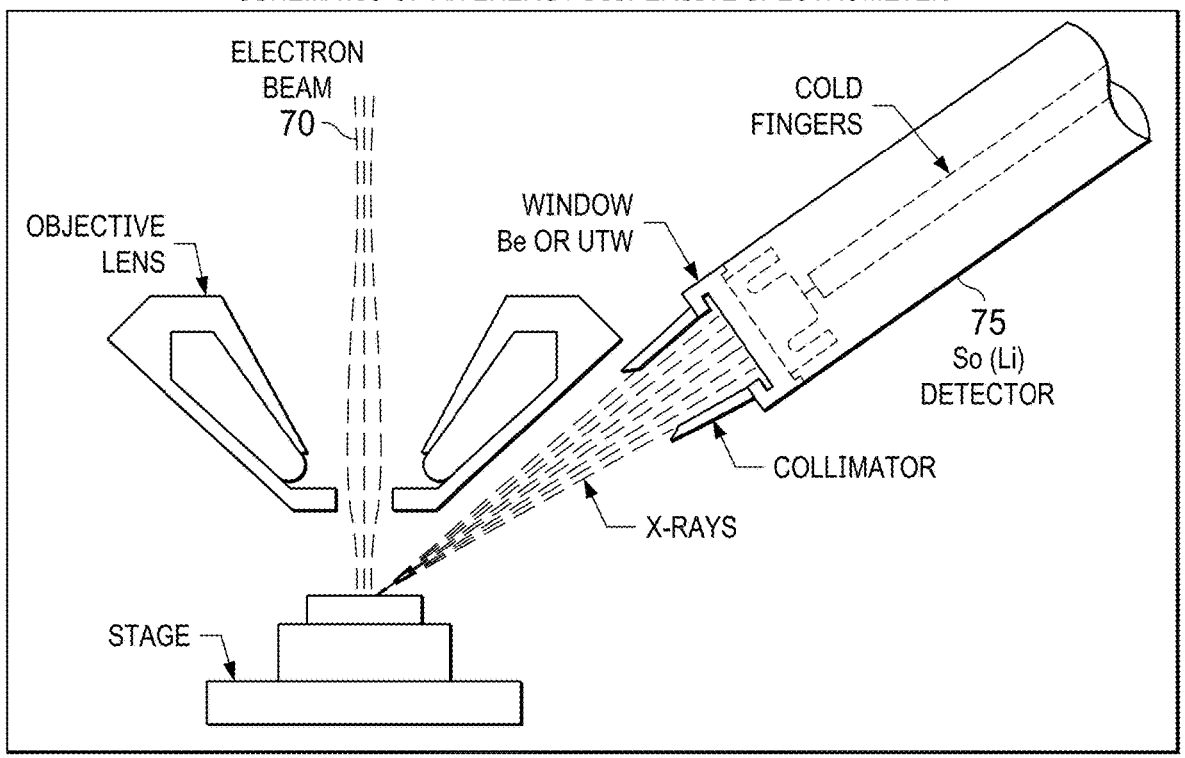
FIG. 3 is a diagram of a scanning electron microscopy coupled with energy dispersive x-ray spectroscopy process in accordance with one or more examples described herein.
Figure 3:
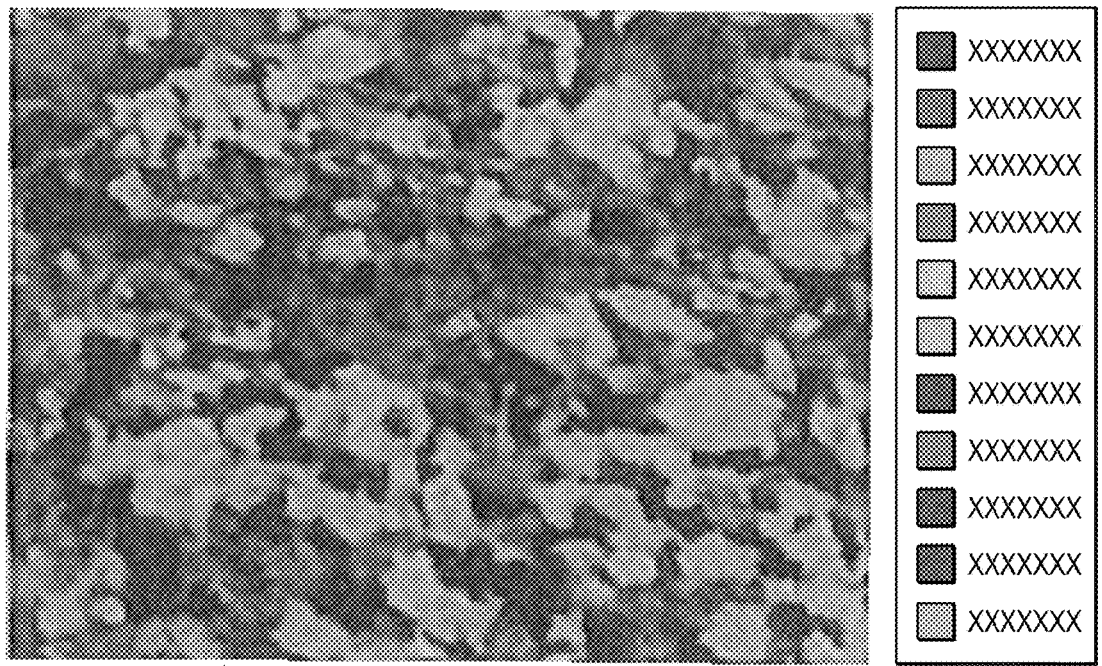

Referring now to FIG. 3, an instructive diagram of EDX is illustrated. EDX relies on the interaction of a source of X-ray excitation with the sample of formation materials. As illustrated, an electron beam 70 is focused on the sample, and an X-ray detector 75 detects the X-rays and converts their energy into a voltage signal which may be analyzed. The analysis provides an EDX spectrum which allows the elemental composition of the sample to be determined. An EDX map 80 may then be developed with the SEM of the sample of formation materials.

Although, EDX coupled with SEM is illustrated as the mineralogy test for box 20, it is to be understood that any sufficient mineralogy test for gathering the desired mineralogy data may be used. Examples of alternative test methods may include, but are not limited to, X-ray diffraction (XRD), X-Ray fluorescence (XRF), energy-dispersive X-ray spectroscopy (EDS), Electron energy loss spectroscopy (EELS), X-Ray photoelectric spectroscopy (XPS), Small angle X-ray diffraction (SAX), Small-angle neutron scattering (SANS), ultra-small-angle neutron scattering (USANS), Atomic absorption spectroscopy (AAS), Auger electron diffraction (AED), Atomic emission spectroscopy (AES), Inductively coupled plasma spectroscopy mass spec (ICP-MS), Inductively coupled plasma—atomic emission spectroscopy (ICP-AES), Inductively coupled plasma—optical emission spectroscopy (ICP-OES), Laser-induced breakdown spectroscopy (LIBS), Raman spectroscopy, Near Infrared spectroscopy, Atomic fluorescence spectroscopy (AFS), and any combination thereof.

Referring again to FIG. 1, box 25 illustrates the data output from the mineralogy test. The mineralogy test may provide the data to determine the quantity and distribution of the minerals within the sample of formation materials, which may be scaled to reservoir scale for the subterranean formation.

Box 30 provides the additional inputs which may be used to determine the effects each treatment would have under designated time, pressure, and temperature conditions. The pressure and temperature conditions may be set to the specific wellbore conditions where treatment exposure with the target formation is desired to occur. The treatment may be a treatment fluid and may comprise various additives which can also be logged.

Figure 4:
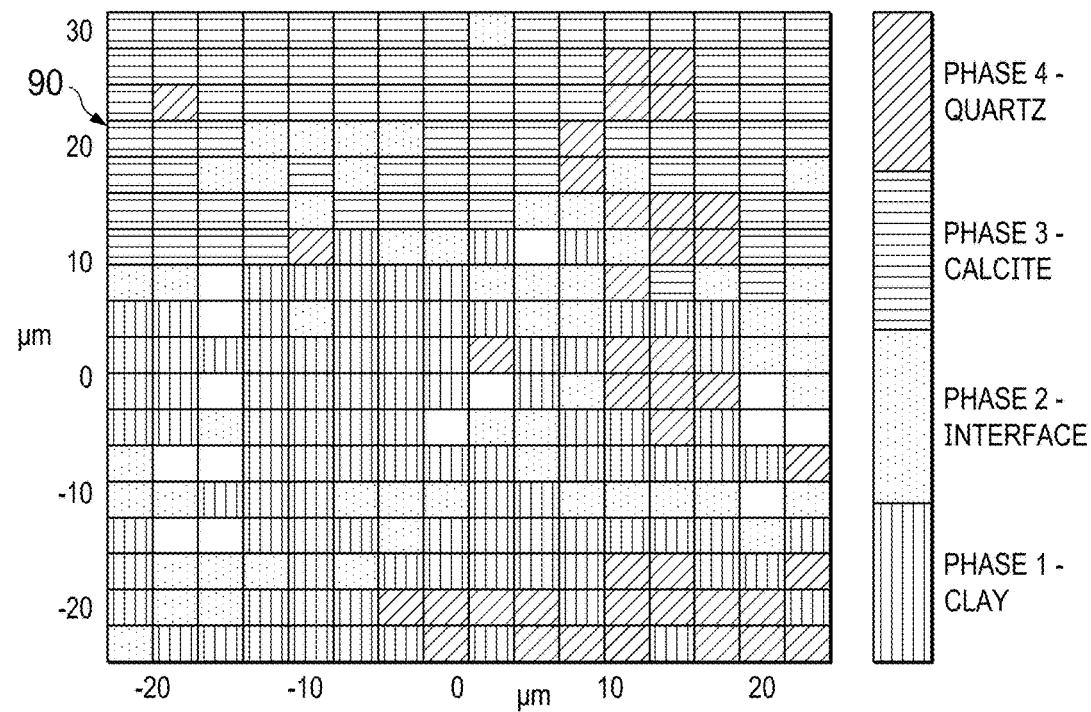
FIG. 4 is a model of the data from the geomechanical and mineralogy tests performed at the same locations to provide the mineral-specific geomechanical properties in accordance with one or more examples described herein.
Figure 4:
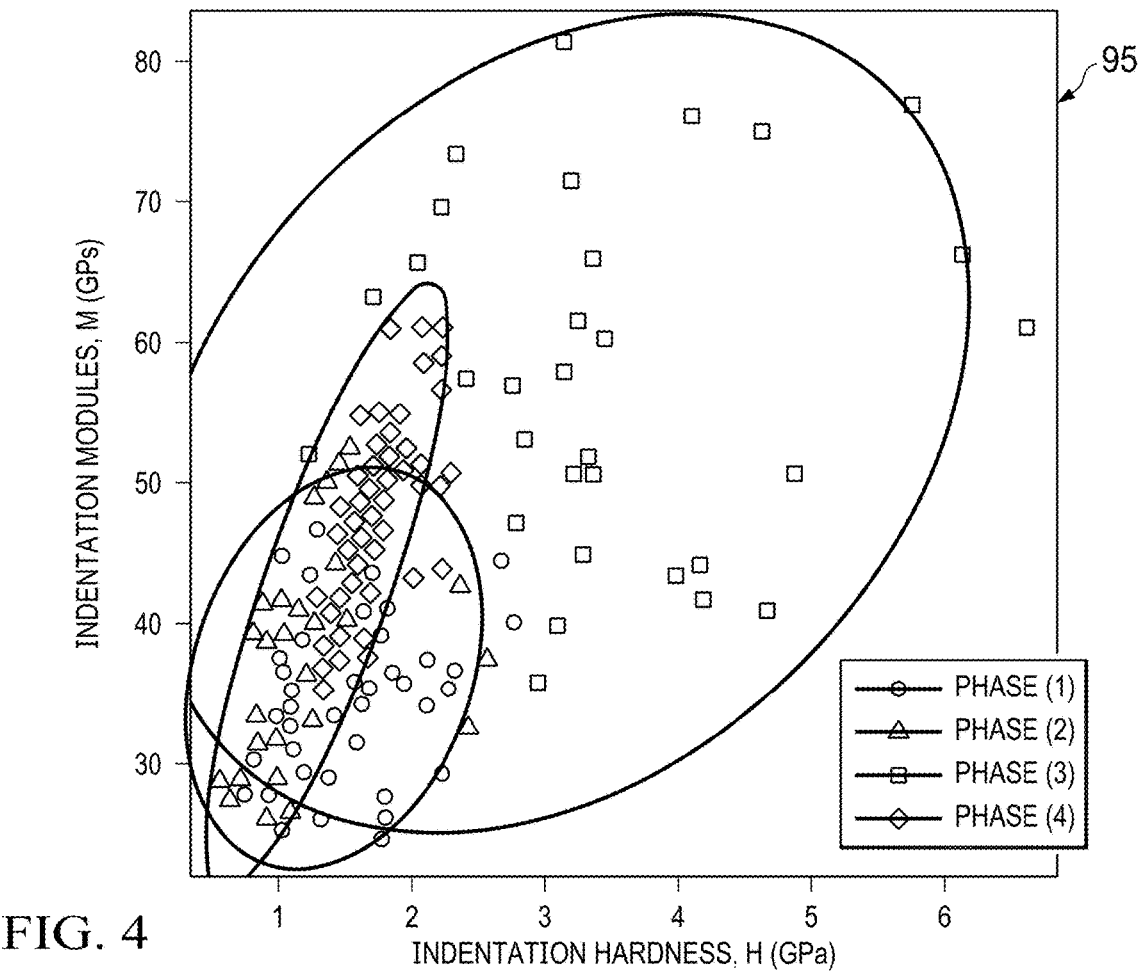

With reference to FIG. 4, the data from the geomechanical and mineralogy tests are performed at the same locations of the samples of the formation materials and are coupled to provide the mineral-specific geomechanical properties. As illustrated in diagram 90, the phased mineral distribution may be visualized by scale. Further, the Young's modulus and hardness may be visualized by phase as illustrated by the graph 95.

With reference again to FIG. 1, box 35 illustrates exposure of the aforementioned samples to one of the test treatments under the desired temperature, pressure, and time input parameters. The formation material samples may be placed in an in-house batch reactor capable of providing controlled temperature and pressure sufficient to resemble the target reservoir temperature and pressure conditions. The equipment may feature accurate syringe pumps for fluid injection and control of overburden pressure. The treatment is one of the wellbore treatments which may potentially be used in a wellbore operation and will be compared with other wellbore treatments to determine the impact each treatment has on the specific formation minerals. The purpose of retesting the samples under the wellbore conditions and after exposure to the treatments is to compare the effect of the treatments under wellbore conditions on the samples with the baseline data obtained previously as was discussed above. This resulting comparison is performed by the predictive model discussed below. The samples may be treated with as many potential treatments as desired. The input parameters for the wellbore conditions (e.g., the temperature, pressure, and time) may be adjusted as desired to analyze the effect of the treatment fluid under varying wellbore conditions.

After the fluid exposure of box 35 is performed, the treated samples may be tested using the same testing parameters as performed previously. The testing of the treated samples is illustrated by arrow 40, for example, if nanoindentation and SEM/EDX were chosen as the geomechanical and mineralogy tests, these tests may be repeated on the treated samples to obtain comparable data. The testing is repeated for each treatment in which analysis is desired.

Box 45 illustrates the data output after the treated samples are tested. The geomechanical test and the mineralogy test provide data which may be used to compare the effects of treatment over time and under wellbore conditions with the baseline data previously obtained.

Box 50 of the workflow illustrates the formation of the predictive model. The predictive model allows for comparison of the treatments by tracking the impact of treatment exposure on the mineral specific rock properties while factoring in the wellbore pressure, temperature, time of exposure, base fluid, fluid additives, and the like. The predictive model thus provides a productivity index that may allow for visualization of the impact the various tested treatments may have on production of the target formation over time.

Figure 5:
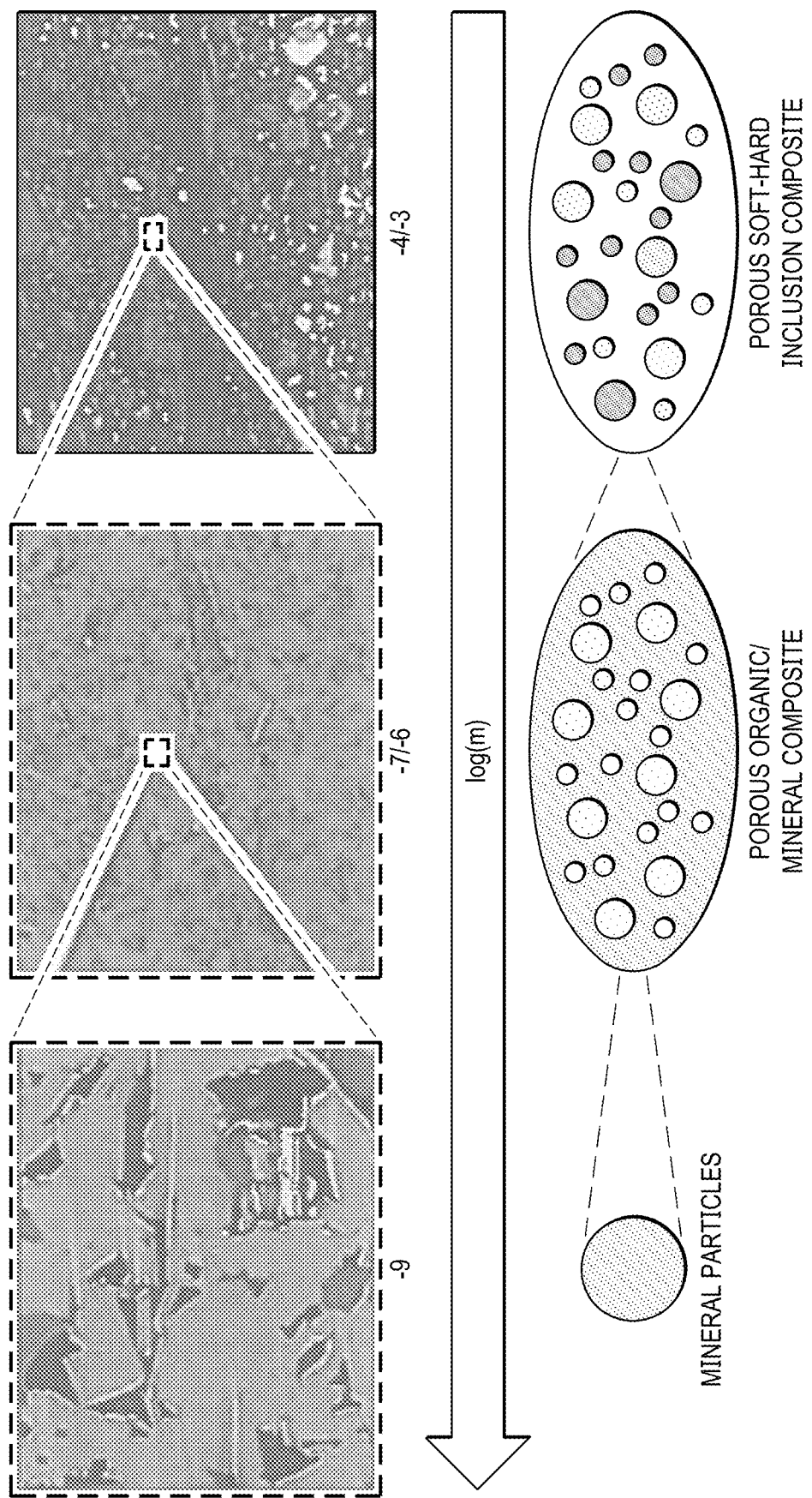
FIG. 5 is an illustration of a mineral to composite multiscale model in accordance with one or more examples described herein.

With reference to FIG. 5, a mineral-to-composite multi-scale model is illustrated. The predictive model is a three-level physically-based multiscale model developed for the target formation which spans from the scale of elementary building blocks (e.g., the minerals) of the formation rock (this is referred to as level 0) to the scale of the macroscopic porous composite formation (this is referred to as level II). These different length scales satisfy the scale separability condition for the application of micromechanics models. Level II represents the millimeter and sub-millimeter ranges. At this scale, the material is a porous clay composite intermixed with silt-sized inclusions. Level I corresponds to the sub-micrometer scale of the porous clay composite. This scale is the scale of nanoindentation and advanced observational methods such as SEM and EDX. Finally, Level 0 is the scale of the elementary solid particles at nanometer length scales. The results from the experimental chemo-mechanical/morphological characterization before and after fluid exposure are used in an inverse approach to obtain both the mechanical properties of the mineral solid particles at nanoscale and the porosity data in between the solid particles. From this analysis, the nanoscale properties can then be linked to the macroscopic properties of rocks at the engineering scale through appropriate homogenization schemes.

Figure 6:
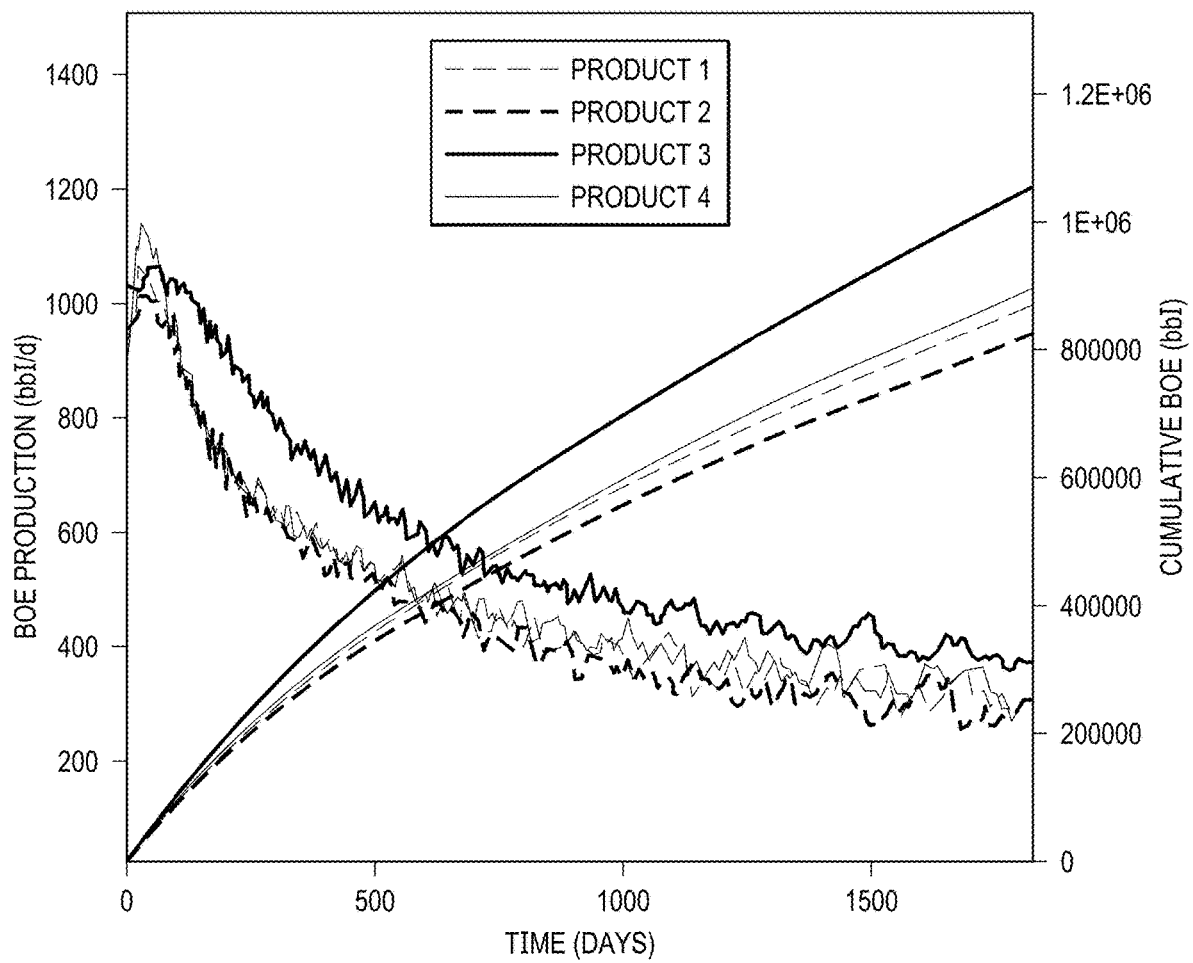
FIG. 6 is a graph illustration of the effect of different treatment fluids on production in accordance with one or more examples described herein.

FIG. 6 is a graph illustration of the effect of different treatment fluids on production over time. The predictive model may improve simulation capabilities by allowing the change in formation rock properties due to fluid interactions to be incorporated into a time-dependent decay curve. The simulations may be able to rank the production decline and cumulative barrel-of-oil equivalent (hereafter "BOE") produced over time for different treatment fluids. As such, the predictive model allows for the simulation of production over time for a well based on the determination of the mineralogy and the mineral properties of the formation.

It should be clearly understood that the examples illustrated by FIGS. 1-6 are merely a few general applications of the principles of this disclosure in practice, and a wide variety of other examples are possible. Therefore, the scope of this disclosure is not limited in any manner to the details of FIGS. 1-6 as described herein.

Minerals which may be treated according to the workflow described herein include, but are not limited to, clay materials of the smectite group such as montmorillonite, bentonite, saponite, nontronite, hectorite, beidellite, and sauconite; the kaolin group such as kaolinite, nacrite, dickite, endellite and halloysite; the illite group such as hydrobiotite, glauconite, mica, and illite; the chlorite group (both 7 and 14 angstrom basal spacings) such as chlorite, greenalite and chamosite; clay minerals not belonging to the above groups such as vermiculite, palygorskite (attapulgite), and sepiolite; and mixed-layer (both regular and irregular) varieties of the above minerals. The clay content of the formations can include a single species of a clay mineral or several species, including the mixed-layer types of clay. The clay-containing formations need not be composed entirely of clay but may contain other mineral components associated therewith. The clays in the formation may be of varying shapes, such as minute, plate-like, tube-like and/or fiber-like particles having an extremely large surface area.

Moreover, the treated minerals may comprise non-clay materials, such as those minerals that may become destabilized due to interaction with the fluids, temperatures, pressures, or contact time. For example, carbonate minerals in a formation can dissolve as a function of an aqueous fluid's chemical potential. Examples of non-clay materials may include quartz, zeolites, calcite, dolomite, siderite, pyrite, feldspars, opal, cristobalite, biotite, clinoptilite, gypsum, anhydrite and the like. The types of minerals and their morphology in the formation may be of varying shapes and ratios. The formations may comprise composites of clay and/or non-clay materials.

Moreover, the treated minerals may interface with other minerals, such as those clays in contact with quartz or clays in contact with carbonates. The interface of minerals may become destabilized due to interaction with the fluids, temperatures, pressures, or contact time. For example, carbonate minerals next to hydrated clay minerals can dissolve more rapidly thereby exposing more clay minerals. Examples of interfaces may include any combination of the clay minerals, smectite group such as montmorillonite, bentonite, saponite, nontronite, hectorite, beidellite, and sauconite; the kaolin group such as kaolinite, nacrite, dickite, endellite and halloysite; the illite group such as hydrobiotite, glauconite, mica, and illite; the chlorite group (both 7 and 14 angstrom basal spacings) such as chlorite, greenalite and chamosite; clay minerals not belonging to the above groups such as vermiculite, palygorskite (attapulgite), and sepiolite; and mixed-layer (both regular and irregular) varieties of the above minerals. The clay content of the formations can include a single species of a clay mineral or several species, including the mixed-layer types of clay, and any combination of non-clay minerals, quartz, zeolites, calcite, dolomite, siderite, pyrite, feldspars, opal, cristobalite, biotite, clinoptilite, gypsum, anhydrite and the like. The types of minerals and their morphology in the formation may be of varying shapes and ratios. The formations may comprise composites of clay and/or non-clay materials.

The treatments tested and described herein may be used during any point of a drilling, completion, or fracturing operation (e.g., with drilling muds, completion fluids, cement additives, perforating fluids, with a spacer fluid, formation stabilization fluid, etc.). The treatments may be incorporated into any fluid used to perform a drilling, completion, perforating, fracturing, stimulation, and/or restimulation operation. For example, the treatments may be incorporated into a fracturing fluid, an acid treatment fluid (.e.g., those fluids comprising acids (proton-releasing species, Bronsted acids, Lewis acids, electron pair acceptors)), a descaling or remedial treatment fluid (e.g., those fluids comprising complexing or chelating agents), a pre-pad fluid, a proppant-laden fluid, a restimulation fluid, gases, foams, etc. As an example, hydraulic fracturing has been utilized for many years to stimulate the production of oil, gas and other formation fluids from subterranean formations. In hydraulic fracturing, a suitable fracturing fluid is introduced into a subterranean formation by way of a wellbore under conditions of flow rate and pressure, which are at least sufficient to create or extend a fracture into a desired portion of the formation. Fracturing fluids that contact the fracture face or formation matrix often interact with formation materials and may damage conductivity of the fracture and permeability of the formation adjacent to the fracture. Utilization of the workflow and the methods described herein may prevent or mitigate this damage by utilizing the optimal treatment fluids to minimize negative fluid-rock interactions.

The treatment may be any suitable fluid or fluid additive that comes in contact with formation minerals. As discussed herein, the workflow may be used to develop a predictive model sufficient to determine an optimized fluid design by evaluation of its impact on the formation and simulating its effect on production over time. Any material or treatment which may be used during any point of a fracturing or stimulation operation may be evaluated by the predictive model. General examples of treatments include, but are not limited to: brines, clay stabilizers including quaternary cationic polymers, cross-linkable gelling agent, cross-linkers, gel breakers such as oxidizers or sequestering agents or acids, viscosity-reducing agents or additives such as hydrocarbon phases, friction reducers, viscosifiers including viscoelastic surfactants, surfactants and wetting agents including relative permeability modifiers, formation consolidating agents, agglomerating agents, amphiphobic generating agents, acids, bases, reactive agents, tracers, in-situ gas and heat generating agents, in-situ acid generators, chelating agents, dewatering surfactants, oil-chisel surfactants, fines migration control agents, scale inhibitors, descaling agents or scale dissolvers, corrosion inhibitors and intensifiers, gas hydrate inhibitors, paraffin inhibitors, rheology modifiers, cationic foaming agents, anionic foaming agents, amphiphobic foaming agents, nonionic foaming agents, weighting agents, proppant, micropropppant, resins, surface active agents, inert solids, fluid loss control agents, emulsifiers, dispersion aids, emulsion thinners, emulsion thickeners, lost circulation materials, pH control additives and buffering agents including esters; biocides, organic solvents and co-solvents, oxidizers, reducers, catalysts for any of the other treatments described herein, and any combinations thereof. The above is inclusive of polymeric (MW>5000 Da) and macromolecular materials, examples of which may be polylactides, polyglycolides, and their acidic forms; as well as polyesters, polylactones, polyamines, polyvinyl alcohol, polyvinylpyrrolidones, polyacrylates, or any copolymers thereof.

Brines are aqueous solutions having an intrinsic electrical conductivity that may be measured in a variety of ways (e.g., with a conductivity probe). Brines may comprise: (i) metal halides (M-X) where M is a cation of Group 1, 2, 13, or a transition metal, and X is a halide ion, hydroxyl ion, borate or boric; specific examples may include potassium chloride, sodium chloride, calcium chloride, etc. (ii) a cation that can be a nitrogen or phosphorous containing multivalent ion such as ammonium, tetraalkyl ammonium, choline, tetraalkyl, hexaalkyl, or hexavalent phosphonium ions, and the counterion or anion may be chloride or any other halide ion (iii) a cationic center that is an oligomeric or polymeric structure having molecular weight of 20 to 1,500 g/mol or in excess of 1,500 g/mol (iv) a cationic center that is a heteroatom (e.g., N, P, etc.) that can be found in surfactants, hydrophobic resins, furfuryl alcohols, ethylene glycol, quaternary amines, bisquaternary amines, etc.

Specific examples of viscosifying agents may include, but are not limited to, galactose, mannose, glucoside, glucose, xylose, arabinose, fructose, glucuronic acid, pyranosyl sulfate, xanthan gum, guar gum and derivatives thereof (such as hydroxypropyl guar and carboxymethylhydroxypropyl guar), cellulose derivatives (such as hydroxy ethyl cellulose), polyacrylate, polymethacrylate, polyacrylamide, polyvinyl alcohol, polyvinylpyrrolidone.

Specific examples of cross-linkers may include, but are not limited to, borate compounds (such as, for example, alkaline earth metal borates, alkali metal-alkaline earth borates, and mixtures thereof), zirconium compounds (such as, for example, zirconium lactate, zirconium lactate triethanolamine, zirconium carbonate, zirconium acetylacetonate, zirconium malate, zirconium citrate, and zirconium diisopropylamine lactate), titanium compounds (such as, for example, titanium lactate, titanium malate, titanium citrate, titanium ammonium lactate, titanium triethanolamine, and titanium acetylacetonate), aluminum compounds (such as, for example, aluminum lactate or aluminum citrate), antimony compounds, chromium compounds, iron compounds, copper compounds, zinc compound, probertite, ulexite, nobleite, frolovite, colemanite, calcined colemanite, priceite, paternoite, hydroboracite, kaliborite.

Specific examples of surfactants may include, but are not limited to, betaines, sulfated or sulfonated alkoxylates, alkyl quaternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, derivatives thereof, and any combinations thereof.

Specific examples of acids may include, but are not limited to, Bronsted type (proton or hydronium donors) such as H-A where A is the counterion, where A is a halogen or halide ion (an element from Group VIIA or 17); an oxyanion such as EOx where E is an non-metal (B, C, N, S, Se, Si, P, As, Ge, a halide) and x is any number from 0 to 7; an organic acid such as carboxylic acids (formic, acetic, propionic, butyric, chloroacetic acid, etc.) multiprotic molecules, such as hydroxycarboxylic and polycarboxylic acids (citric acid, maleic acid, lactic acid, hydroxyacetic acid, tartaric acid, succinic acid, aldaric acids, glucaric acid, mucic acid, galactaric acid, and acid sugars), sulfonic acids (methanesulfonic acid, sulfamic acid, p-toluenesulfonic acid as examples), keto acids (i.e., levulinic acid), aminopolycarboxylic acids, aminophosphonates, phosphonic acids, phosphinic acids; and derivatives thereof without limitation based on established chemical principles. Alternatively, the fully or partially deprotonated form of these type of acids is considered to be applicable for the purpose of this invention.

Furthermore, Bronsted acids further includes derivatized or complexed salts of H-A, such as urea derivatives of hydrofluoric (HF) or hydrochloric (HCl) acid; alternatively the HCl salts are also known as keto-amine hydrochlorides. As an example urea hydrochloride, or 1,3-dimethylurea or 1,1-diethylurea, or combinations thereof can be made. Furthermore, Lewis acid type agents where there is a species or element capable of accepting (coordinating) a pair of electrons, or in some instances even from a single electron source (radical). Examples include oxidized species of Al, Fe, Cu, Ni, Ti, Mn, Mg, Ca; tetraalkyl ammonium species.

Figure 7:
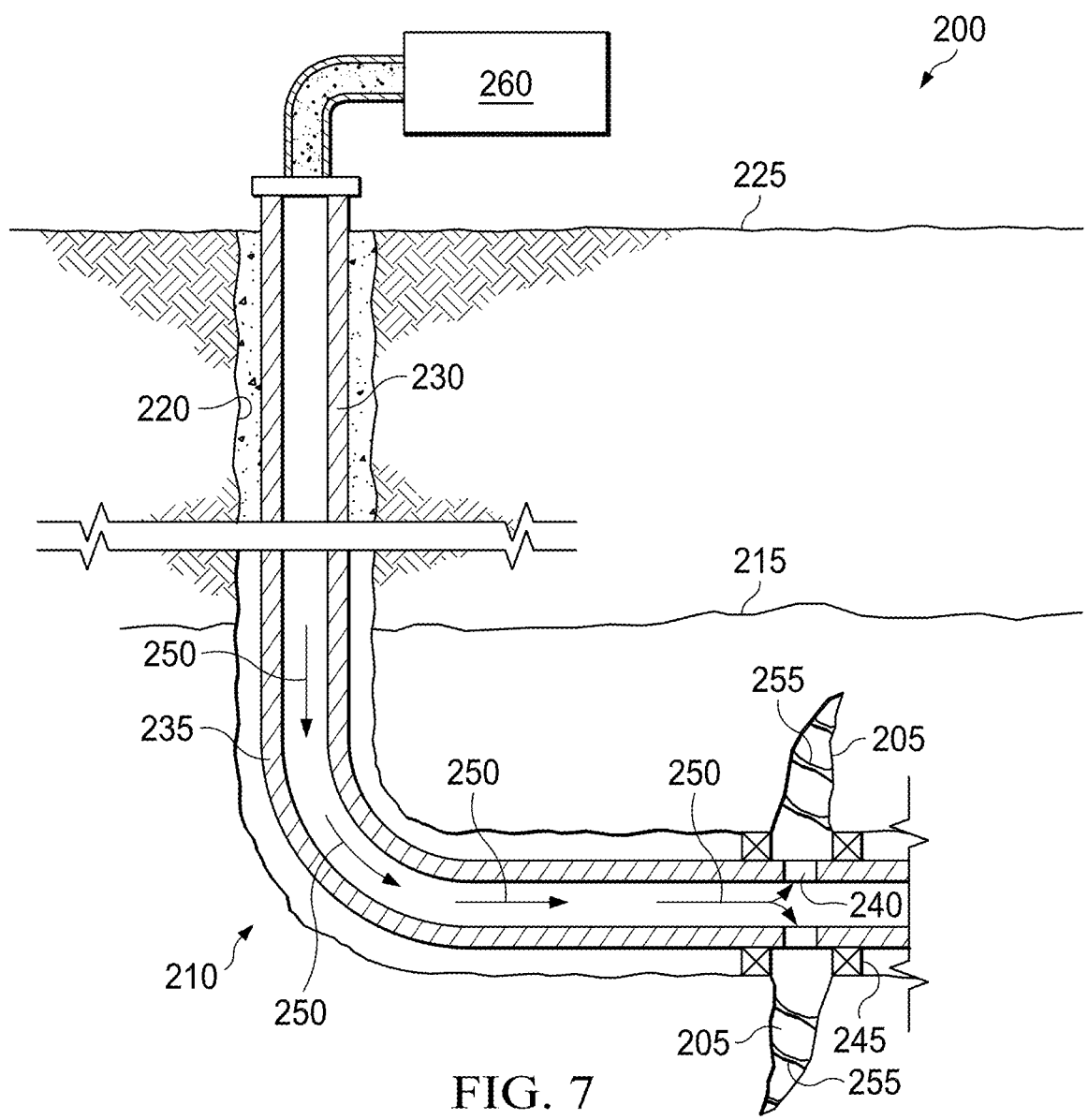
FIG. 7 is a cross-section a fracturing operation in a subterranean formation in accordance with one or more examples described herein.

FIG. 7 illustrates a cross-section of a system 200 comprising a fracture 205 formed in subterranean formation 215. The fracture 205 may formed, enhanced, propped, or otherwise treated using a treatment fluid 250 selected via the workflow as described herein. As illustrated, a well 210 penetrates a portion of the subterranean formation 215 surrounding a wellbore 220. The wellbore 220 extends from the surface 225. Although shown as vertical wellbore deviating to a horizontal wellbore, the wellbore 220 may include horizontal, vertical, slant, curved, and other types of wellbore geometries and orientations, and the treatment fluid 250 may be applied to a subterranean zone surrounding any portion of the wellbore 220. The wellbore 220 may include a casing 230 that is cemented, uncemented, or otherwise secured to the wall of the wellbore 220. In some examples, the wellbore 220 may be uncased or include uncased sections. Perforations may be formed in the casing 230 to allow the treatment fluid 250 and/or other materials to flow into the subterranean formation 215. In cased wells, perforations may be formed using shape charges, a perforating gun, hydro-jetting, and/or other tools.

The well 210 is shown with a work string 235 descending from the surface 225 into the wellbore 220. A high-pressure pump system 260 is coupled to work string 235 to pump the selected treatment fluid 250 into the wellbore 220 as discussed below. The work string 235 may include coiled tubing, jointed pipe, and/or other structures that allow the treatment fluid 250 to flow into the wellbore 220. The work string 235 may include flow control devices, bypass valves, ports, and/or other tools or well devices capable of controlling the flow of a fluid from the interior of the work string 235 into the subterranean formation 215. For example, the work string 235 may include ports 240 that are spaced apart from the wall of the wellbore 220 to communicate the treatment fluid 250 into an annulus in the wellbore 220 adjacent to a fracture 205 and between the work string 235 and the wall of the wellbore 220. Alternatively, the work string 235 may include ports 240 directly adjacent to a fracture 205 in the wall of the wellbore 220 to communicate the treatment fluid 250 directly into the fracture 205.

With continued reference to FIG. 7, the work string 235 and/or the wellbore 220 may include one or more sets of packers 245 that seal the annulus between the work string 235 and wellbore 220 to define an interval of the wellbore 220 into which the treatment fluid 250 may be pumped. FIG. 7 illustrates two packers 245, one defining an uphole boundary of the interval and one defining the downhole end of the interval.

Treatment fluid 250 may be introduced into wellbore 220 at a sufficient pressure to create, enhance, and/or enter fracture 205. As discussed herein, treatment fluid 250 has been analyzed from the workflow process discussed above and selected by using a predictive model as discussed above to remedy formation damage to the subterranean formation 215 and/or prevent formation damage to the subterranean formation 215. Relative to other compared treatment fluids analyzed by the workflow, treatment fluid 250 should provide the best overall result on production over time for the specific composition of subterranean formation 215. Treatment fluid 250 may be any treatment fluid or treatment fluid product or additive used in the wellbore operation. For example, treatment fluid 250 may be a fracturing fluid, proppant-laden fluid, spacer fluid, etc. With the subterranean formation 215 sufficiently stabilized, hydrocarbons may freely flow out of propped fracture 205 via the channels opened between the pillar-like aggregates 255.

It should be clearly understood that the example illustrated by FIG. 7 is merely one general application of the principles of this disclosure in practice, and a wide variety of other examples are possible. Therefore, the scope of this disclosure is not limited in any manner to the details of FIG. 7 as described herein.

A database of predictive models may be built for some examples of the formation individual materials. The database may comprise the mineral specific geomechanical properties changes with specific treatments. Mineralogy data of the formation materials to provide a mineral-specific index which may be searched or used to simulate the new formation material samples to determine how the new formation composition will respond to treatments. The predictive models of the formation materials may also be indexed and searchable such that the new formation material composition may be compared with the index of the previously tested treatments impacts on production over time (i.e., the production index for each previously tested treatment). The database may be used to reduce the need for retesting of treatments on formation materials which have been tested previously. The database may also allow for the use of logging data instead of cores, cuttings, or outcrops to determine the geomechanical and mineralogy of the formation should the subject formation be comprised of the minerals already analyzed and indexed in the database.

Provided are methods for selecting a treatment for a subterranean formation in accordance with the disclosure and the illustrated FIGs. An example method comprises obtaining a formation material, measuring a geomechanical property of the formation material, measuring a mineralogy of the formation material, preparing a predictive model for the formation material from the measured geomechanical property and the mineralogy of the formation material; wherein the predictive model analyzes production over time for a plurality of treatments for the formation material, wherein the formation material is treated with each treatment in the plurality of treatments and the geomechanical property and the mineralogy of the formation material are measured before and after an individual treatment, selecting the treatment having the greatest production from the plurality of treatments, and contacting the subterranean formation with the treatment.

Additionally or alternatively, the method may include one or more of the following features individually or in combination. The measuring of the geomechanical properties of the formation material may further comprise measuring at least one of the mineral hardness, Young's modulus, Poisson's ratio, fracture toughness, tensile strength, minimum horizontal stress, shear modulus, or the bulk modulus of the formation material. The measuring of the geomechanical properties of the formation material may further comprise performing a nanoindentation test, a brinelle hardness test, a Young's modulus test, a Poison's ratio test, a Brazilian hardness test, a tensile test, a triaxial or uniaxial test, a compressive strength test, a fracture toughness test, an ultrasonic velocity test, a proppant embedment test, an impact hammer test, or a crush test on the formation material. The measuring of the mineralogy of the formation material may further comprise performing energy dispersive x-ray spectroscopy, scanning electron microscopy, X-ray diffraction, X-ray fluorescence, electron energy loss spectroscopy, X-ray photoelectric spectroscopy, small angle X-ray diffraction, small-angle neutron scattering, ultra-small-angle neutron scattering, atomic absorption spectroscopy, auger electron diffraction, atomic emission spectroscopy, inductively coupled plasma spectroscopy mass spec, inductively coupled plasma—atomic emission spectroscopy, inductively coupled plasma—optical emission spectroscopy, laser-induced breakdown spectroscopy, Raman spectroscopy, near infrared spectroscopy, or atomic fluorescence spectroscopy on the formation material. The formation material may be obtained from a core, cutting, or outcrop. The selected treatment may further comprise a treatment selected from the group consisting of a clay stabilizer, cross-linkable gelling agent, cross-linker, gel breaker, viscosifier, viscoelastic surfactant, surfactant, formation consolidating agent, agglomerating agent, amphiphobic generating agent, in-situ gas and heat generating agent, in-situ acid generator, chelating agent, dewatering surfactant, oil-chisel surfactant, fines migration control agent, scale inhibitor, corrosion inhibitor, hydrate inhibitor, paraffin inhibitor, rheology modifier, catalyst, cationic foaming agent, anionic foaming agent, amphiphobic foaming agent, nonionic foaming agent, demulsifier, weighting agent, inert solid, fluid loss control agent, emulsifier, dispersion aid, emulsion thinner, emulsion thickener, lost circulation material, pH control additive, biocide, solvent, oxidizer, reducer, acid, and any combinations thereof. The selected treatment may further comprise a treatment selected from the group consisting of potassium chloride, sodium chloride, ammonium chloride, tetramethyl ammonium chloride, cationic polymers, cationic surfactants, hydrophobic resins, transition metals, furfuryl alcohols, ethylene glycol, quaternary amines, bisquaternary amines, galactose, mannose, glucoside, glucose, xylose, arabinose, fructose, glucuronic acid, pyranosyl sulfate, xanthan gum, guar gum, hydroxypropyl guar, carboxymethylhydroxypropyl guar, hydroxyethyl cellulose, polyacrylate, polymethacrylate, polyacrylamide, polyvinyl alcohol, polyvinylpyrrolidone, borate compounds, alkaline earth metal borates, alkali metal-alkaline earth borates, zirconium compounds, zirconium lactate, zirconium lactate triethanolamine, zirconium carbonate, zirconium acetylacetonate, zirconium malate, zirconium citrate, zirconium diisopropylamine lactate, titanium compounds, titanium lactate, titanium malate, titanium citrate, titanium ammonium lactate, titanium triethanolamine, titanium acetylacetonate, aluminum compounds, aluminum lactate, aluminum citrate, antimony compounds, chromium compounds, iron compounds, copper compounds, zinc compounds, probertite, ulexite, nobleite, frolovite, colemanite, calcined colemanite, priceite, paternoite, hydroboracite, kaliborite, betaines, sulfated or sulfonated alkoxylates, alkyl quaternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates, sodium dodecane sulfonate, trimethyl hexadecyl ammonium bromide, derivatives thereof, and any combinations thereof. The formation material may further comprise a material selected from the group consisting of montmorillonite, bentonite, saponite, nontronite, hectorite, beidellite, sauconite, kaolinite, nacrite, dickite, endellite, halloysite, hydrobiotite, glauconite, illite, chlorite, greenalite, chamosite, vermiculite, palygorskite, sepiolite, zeolites, quartz, calcite, dolomite, aragonite pyrite and iron sulfide phases, feldspar, opal, cristobalite, biotite, clinoptilite, gypsum, anhydrite and any combination thereof. The subterranean formation may be contacted with the selected treatment during a fracturing operation. The predictive model may be a first predictive model; wherein the method further comprises repeating the method with a different formation material to provide a second predictive model; wherein the method further comprises building a database comprising the first predictive model and the second predictive model.

Provided are methods for selecting a treatment for a subterranean formation in accordance with the disclosure and the illustrated FIGs. An example method comprises obtaining a formation material from a core, cutting, or outcrop, measuring a geomechanical property of the formation material, measuring a mineralogy of the formation material, comparing the geomechanical property and the mineralogy of the formation material with a database comprising a predictive model of the formation material; wherein the predictive model analyzes production over time for a plurality of treatments for the formation material, selecting the treatment having the greatest production from the plurality of treatments, and contacting the subterranean formation with the treatment.

Additionally or alternatively, the method may include one or more of the following features individually or in combination. The measuring of the geomechanical properties of the formation material may further comprise measuring at least one of the mineral hardness, Young's modulus, Poisson's ratio, fracture toughness, tensile strength, minimum horizontal stress, shear modulus, or the bulk modulus of the formation material. The measuring of the geomechanical properties of the formation material may further comprise performing a nanoindentation test, a brinelle hardness test, a Young's modulus test, a Poison's ratio test, a Brazilian hardness test, a tensile test, a triaxial or uniaxial test, a compressive strength test, a fracture toughness test, an ultrasonic velocity test, a proppant embedment test, an impact hammer test, or a crush test on the formation material. The measuring of the mineralogy of the formation material may further comprise performing energy dispersive x-ray spectroscopy, scanning electron microscopy, X-ray diffraction, X-ray fluorescence, electron energy loss spectroscopy, X-ray photoelectric spectroscopy, small angle X-ray diffraction, small-angle neutron scattering, ultra-small-angle neutron scattering, atomic absorption spectroscopy, auger electron diffraction, atomic emission spectroscopy, inductively coupled plasma spectroscopy mass spec, inductively coupled plasma—atomic emission spectroscopy, inductively coupled plasma—optical emission spectroscopy, laser-induced breakdown spectroscopy, Raman spectroscopy, near infrared spectroscopy, or atomic fluorescence spectroscopy on the formation material. The formation material may be obtained from a core, cutting, or outcrop. The selected treatment may further comprise a treatment selected from the group consisting of a clay stabilizer, cross-linkable gelling agent, cross-linker, gel breaker, viscosifier, viscoelastic surfactant, surfactant, formation consolidating agent, agglomerating agent, amphiphobic generating agent, in-situ gas and heat generating agent, in-situ acid generator, chelating agent, dewatering surfactant, oil-chisel surfactant, fines migration control agent, scale inhibitor, corrosion inhibitor, hydrate inhibitor, paraffin inhibitor, rheology modifier, catalyst, cationic foaming agent, anionic foaming agent, amphiphobic foaming agent, nonionic foaming agent, demulsifier, weighting agent, inert solid, fluid loss control agent, emulsifier, dispersion aid, emulsion thinner, emulsion thickener, lost circulation material, pH control additive, biocide, solvent, oxidizer, reducer, acid, and any combinations thereof. The selected treatment may further comprise a treatment selected from the group consisting of potassium chloride, sodium chloride, ammonium chloride, tetramethyl ammonium chloride, cationic polymers, cationic surfactants, hydrophobic resins, transition metals, furfuryl alcohols, ethylene glycol, quaternary amines, bisquaternary amines, galactose, mannose, glucoside, glucose, xylose, arabinose, fructose, glucuronic acid, pyranosyl sulfate, xanthan gum, guar gum, hydroxypropyl guar, carboxymethylhydroxypropyl guar, hydroxyethyl cellulose, polyacrylate, polymethacrylate, polyacrylamide, polyvinyl alcohol, polyvinylpyrrolidone, borate compounds, alkaline earth metal borates, alkali metal-alkaline earth borates, zirconium compounds, zirconium lactate, zirconium lactate triethanolamine, zirconium carbonate, zirconium acetylacetonate, zirconium malate, zirconium citrate, zirconium diisopropylamine lactate, titanium compounds, titanium lactate, titanium malate, titanium citrate, titanium ammonium lactate, titanium triethanolamine, titanium acetylacetonate, aluminum compounds, aluminum lactate, aluminum citrate, antimony compounds, chromium compounds, iron compounds, copper compounds, zinc compounds, probertite, ulexite, nobleite, frolovite, colemanite, calcined colemanite, priceite, paternoite, hydroboracite, kaliborite, betaines, sulfated or sulfonated alkoxylates, alkyl quaternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates, sodium dodecane sulfonate, trimethyl hexadecyl ammonium bromide, derivatives thereof, and any combinations thereof. The formation material may further comprise a material selected from the group consisting of montmorillonite, bentonite, saponite, nontronite, hectorite, beidellite, sauconite, kaolinite, nacrite, dickite, endellite, halloysite, hydrobiotite, glauconite, illite, chlorite, greenalite, chamosite, vermiculite, palygorskite, sepiolite, zeolites, quartz, calcite, dolomite, aragonite pyrite and iron sulfide phases, feldspar, opal, cristobalite, biotite, clinoptilite, gypsum, anhydrite and any combination thereof. The subterranean formation may be contacted with the selected treatment during a fracturing operation. The predictive model may be a first predictive model; wherein the method further comprises repeating the method with a different formation material to provide a second predictive model; wherein the method further comprises building a database comprising the first predictive model and the second predictive model.

Provided are systems for treating a subterranean formation in accordance with the disclosure and the illustrated FIGs. An example system comprises a formation material, a predictive model for the formation material, wherein the predictive model analyzes production over time for a plurality of treatments for the formation material, wherein the formation material is treated with each treatment in the plurality of treatments and a geomechanical property and a mineralogy of the formation material are measured before and after an individual treatment, the plurality of treatments, and fracturing equipment for fracturing the subterranean formation.

Additionally or alternatively, the system may include one or more of the following features individually or in combination. The measuring of the geomechanical properties of the formation material may further comprise measuring at least one of the mineral hardness, Young's modulus, Poisson's ratio, fracture toughness, tensile strength, minimum horizontal stress, shear modulus, or the bulk modulus of the formation material. The measuring of the geomechanical properties of the formation material may further comprise performing a nanoindentation test, a brinelle hardness test, a Young's modulus test, a Poison's ratio test, a Brazilian hardness test, a tensile test, a triaxial or uniaxial test, a compressive strength test, a fracture toughness test, an ultrasonic velocity test, a proppant embedment test, an impact hammer test, or a crush test on the formation material. The measuring of the mineralogy of the formation material may further comprise performing energy dispersive x-ray spectroscopy, scanning electron microscopy, X-ray diffraction, X-ray fluorescence, electron energy loss spectroscopy, X-ray photoelectric spectroscopy, small angle X-ray diffraction, small-angle neutron scattering, ultra-small-angle neutron scattering, atomic absorption spectroscopy, auger electron diffraction, atomic emission spectroscopy, inductively coupled plasma spectroscopy mass spec, inductively coupled plasma—atomic emission spectroscopy, inductively coupled plasma—optical emission spectroscopy, laser-induced breakdown spectroscopy, Raman spectroscopy, near infrared spectroscopy, or atomic fluorescence spectroscopy on the formation material. The formation material may be obtained from a core, cutting, or outcrop. The selected treatment may further comprise a treatment selected from the group consisting of a clay stabilizer, cross-linkable gelling agent, cross-linker, gel breaker, viscosifier, viscoelastic surfactant, surfactant, formation consolidating agent, agglomerating agent, amphiphobic generating agent, in-situ gas and heat generating agent, in-situ acid generator, chelating agent, dewatering surfactant, oil-chisel surfactant, fines migration control agent, scale inhibitor, corrosion inhibitor, hydrate inhibitor, paraffin inhibitor, rheology modifier, catalyst, cationic foaming agent, anionic foaming agent, amphiphobic foaming agent, nonionic foaming agent, demulsifier, weighting agent, inert solid, fluid loss control agent, emulsifier, dispersion aid, emulsion thinner, emulsion thickener, lost circulation material, pH control additive, biocide, solvent, oxidizer, reducer, acid, and any combinations thereof. The selected treatment may further comprise a treatment selected from the group consisting of potassium chloride, sodium chloride, ammonium chloride, tetramethyl ammonium chloride, cationic polymers, cationic surfactants, hydrophobic resins, transition metals, furfuryl alcohols, ethylene glycol, quaternary amines, bisquaternary amines, galactose, mannose, glucoside, glucose, xylose, arabinose, fructose, glucuronic acid, pyranosyl sulfate, xanthan gum, guar gum, hydroxypropyl guar, carboxymethyl-hydroxypropyl guar, hydroxyethyl cellulose, polyacrylate, polymethacrylate, polyacrylamide, polyvinyl alcohol, polyvinylpyrrolidone, borate compounds, alkaline earth metal borates, alkali metal-alkaline earth borates, zirconium compounds, zirconium lactate, zirconium lactate triethanolamine, zirconium carbonate, zirconium acetylacetonate, zirconium malate, zirconium citrate, zirconium diisopropylamine lactate, titanium compounds, titanium lactate, titanium malate, titanium citrate, titanium ammonium lactate, titanium triethanolamine, titanium acetylacetonate, aluminum compounds, aluminum lactate, aluminum citrate, antimony compounds, chromium compounds, iron compounds, copper compounds, zinc compounds, probertite, ulexite, nobleite, frolovite, colemanite, calcined colemanite, priceite, patemoite, hydroboracite, kaliborite, betaines, sulfated or sulfonated alkoxylates, alkyl quaternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates, sodium dodecane sulfonate, trimethyl hexadecyl ammonium bromide, derivatives thereof, and any combinations thereof. The formation material may further comprise a material selected from the group consisting of montmorillonite, bentonite, saponite, nontronite, hectorite, beidellite, sauconite, kaolinite, nacrite, dickite, endellite, halloysite, hydrobiotite, glauconite, illite, chlorite, greenalite, chamosite, vermiculite, palygorskite, sepiolite, zeolites, quartz, calcite, dolomite, aragonite pyrite and iron sulfide phases, feldspar, opal, cristobalite, biotite, clinoptilite, gypsum, anhydrite and any combination thereof. The subterranean formation may be contacted with the selected treatment during a fracturing operation. The predictive model may be a first predictive model; wherein the method further comprises repeating the method with a different formation material to provide a second predictive model; wherein the method further comprises building a database comprising the first predictive model and the second predictive model.

It is also to be recognized that the disclosed methods and systems may also directly or indirectly affect the various downhole equipment and tools that may contact components of the methods and systems disclosed herein. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the methods and systems generally described above and depicted in FIGS. 1-7.

The preceding description provides various examples of the systems and methods of use disclosed herein which may contain different method steps and alternative combinations of components. It should be understood that although individual examples may be discussed herein the present disclosure covers all combinations of the disclosed examples, including, without limitation, the different component combinations, method step combinations, and properties of the system. It should be understood that the compositions and methods are described in terms of "comprising," "containing," or "including" various components or steps. The compositions and methods can also "consist essentially of or "consist of the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method of selecting a treatment for a subterranean formation comprising:
    A) obtaining a formation material,
    B) measuring a geomechanical property of the formation material,
    C) measuring a mineralogy of the formation material,
    D) preparing a three-level physically-based predictive model for the formation material from the measured geomechanical property and the mineralogy of the formation material; wherein the predictive model analyzes production over time for a plurality of treatments for the formation material, wherein the formation material is treated with each treatment in the plurality of treatments and the geomechanical property and the mineralogy of the formation material are measured before and after an individual treatment for three distinct scales, wherein the first scale measures a millimeter and sub-millimeter range of the formation materal, wherein a second scale measures a sub-micrometer range of the formation material, wherein a third scale measures a nanometer range of the formation material, wherein the predictive model predicts a treatment's effect on productivity over time at the reservoir scale by simulating production over time for a well based on the determination of the mineralogy and the mineral properties of the subterranean formation,
    E) determining the degree of damage to the formation material after the formation material is treated with each treatment in the plurality of treatments and the geomechanical property and the mineralogy of the formation material are measured before and after an individual treatment,
    F) selecting the treatment having the greatest production from the plurality of treatments by determining from the predictive model the damage to the formation material and selecting the treatment from the plurality that induces the least damage, wherein the selected treatment comprises a treatment selected from the group consisting of a clay stabilizer, cross-linkable gelling agent, cross-linker, gel breaker, viscosifier, viscoelastic surfactant, surfactant, formation consolidating agent, agglomerating agent, amphiphobic generating agent, in-situ gas and heat generating agent, in-situ acid generator, chelating agent, dewatering surfactant, oil- chisel surfactant, fines migration control agent, scale inhibitor, corrosion inhibitor, hydrate inhibitor, paraffin inhibitor, rheology modifier, catalyst, cationic foaming agent, anionic foaming agent, amphiphobic foaming agent, nonionic foaming agent, demulsifier, weighting agent, inert solid, fluid loss control agent, emulsifier, dispersion aid, emulsion thinner, emulsion thickener, lost circulation material, pH control additive, biocide, solvent, oxidizer, reducer, acid, and any combinations thereof, and
    G) contacting the subterranean formation with the selected treatment.

2. The method of claim 1, wherein the measuring the geomechanical properties of the formation material comprises measuring at least one of the mineral hardness, Young's modulus, Poisson's ratio, fracture toughness, tensile strength, minimum horizontal stress, shear modulus, or the bulk modulus of the formation material.

3. The method of claim 1, wherein the measuring the geomechanical properties of the formation material comprises performing a nanoindentation test, a Brinell hardness test, a Young's modulus test, a Poison's ratio test, a Brazilian hardness test, a tensile test, a triaxial or uniaxial test, a compressive strength test, a fracture toughness test, an ultrasonic velocity test, a proppant embedment test, an impact hammer test, or a crush test on the formation material.

4. The method of claim 1, wherein the measuring the mineralogy of the formation material comprises performing energy dispersive x-ray spectroscopy, scanning electron microscopy, X-ray diffraction, X-ray fluorescence, electron energy loss spectroscopy, X-ray photoelectric spectroscopy, small angle X-ray diffraction, small-angle neutron scattering, ultra-small-angle neutron scattering, atomic absorption spectroscopy, auger electron diffraction, atomic emission spectroscopy, inductively coupled plasma spectroscopy mass spec, inductively coupled plasma—atomic emission spectroscopy, inductively coupled plasma—optical emission spectroscopy, laser-induced breakdown spectroscopy, Raman spectroscopy, near infrared spectroscopy, or atomic fluorescence spectroscopy on the formation material.

5. The method of claim 1, wherein the formation material is obtained from a core, cutting, or outcrop.

6. The method of claim 1, wherein the selected treatment comprises a treatment selected from the group consisting of potassium chloride, sodium chloride, ammonium chloride, tetramethyl ammonium chloride, cationic polymers, cationic surfactants, hydrophobic resins, transition metals, furfuryl alcohols, ethylene glycol, quaternary amines, bisquaternary amines, galactose, mannose, glucoside, glucose, xylose, arabinose, fructose, glucuronic acid, pyranosyl sulfate, xanthan gum, guar gum, hydroxypropyl guar, carboxymethylhydroxypropyl guar, hydroxyethyl cellulose, polyacrylate, polymethacrylate, polyacrylamide, polyvinyl alcohol, polyvinylpyrrolidone, borate compounds, alkaline earth metal borates, alkali metal-alkaline earth borates, zirconium compounds, zirconium lactate, zirconium lactate triethanolamine, zirconium carbonate, zirconium acetylacetonate, zirconium malate, zirconium citrate, zirconium diisopropylamine lactate, titanium compounds, titanium lactate, titanium malate, titanium citrate, titanium ammonium lactate, titanium triethanolamine, titanium acetylacetonate, aluminum compounds, aluminum lactate, aluminum citrate, antimony compounds, chromium compounds, iron compounds, copper compounds, zinc compounds, probertite, ulexite, nobleite, frolovite, colemanite, calcined colemanite, priceite, paternoite, hydroboracite, kaliborite, betaines, sulfated or sulfonated alkoxylates, alkyl quaternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates, sodium dodecane sulfonate, trimethyl hexadecyl ammonium bromide, derivatives thereof, and any combinations thereof.

7. The method of claim 1, wherein the formation material comprises a material selected from the group consisting of montmorillonite, bentonite, saponite, nontronite, hectorite, beidellite, sauconite, kaolinite, nacrite, dickite, endellite, halloysite, hydrobiotite, glauconite, illite, chlorite, greenalite, chamosite, vermiculite, palygorskite, sepiolite, zeolites, quartz, calcite, dolomite, aragonite pyrite and iron sulfide phases, feldspar, opal, cristobalite, biotite, clinoptilite, gypsum, anhydrite and any combination thereof.

8. The method of claim 1, wherein the subterranean formation is contacted with the selected treatment during a fracturing operation.

9. The method of claim 1, wherein the predictive model is a first predictive model; wherein the method further comprises repeating A) through F) of the method with a different formation material to provide a second predictive model; wherein the method further comprises building a database comprising the first predictive model and the second predictive model.

10. A method of selecting a treatment for a subterranean formation comprising:
obtaining a formation material from a core, cutting, or outcrop,
measuring a geomechanical property of the formation material,
measuring a mineralogy of the formation material,
comparing the geomechanical property and the mineralogy of the formation material with a database comprising a three level physically-based predictive model of the formation material to determine the degree of damage to the formation material for three distinct scales, wherein a first scale measures a millimeter and sub-millimeter range of the formation material, wherein a second scale measures a sub-micrometer range of the formation material, wherein a third scale measures a nanometer range of the formation material; wherein the predictive model analyzes production over time for a plurality of treatments for the formation material, wherein the predictive model predicts a treatment's effect on productivity over time at the reservoir scale by simulating production over time for a well based on the determination of the mineralogy and the mineral properties of the subterranean formation,
determining the degree of damage to the formation material from the predictive model,
selecting the treatment having the greatest production from the plurality of treatments by determining from the predictive model the damage to the formation material and selecting the treatment from the plurality that induces the least damage, wherein the selected treatment comprises a treatment selected from the group consisting of a clay stabilizer, cross-linkable gelling agent, cross-linker, gel breaker, viscosifier, viscoelastic surfactant, surfactant, formation consolidating agent, agglomerating agent, amphiphobic generating agent, in-situ gas and heat generating agent, in-situ acid generator, chelating agent, dewatering surfactant, oil-chisel surfactant, fines migration control agent, scale inhibitor, corrosion inhibitor, hydrate inhibitor, paraffin inhibitor, rheology modifier, catalyst, cationic foaming agent, anionic foaming agent, amphiphobic foaming agent, nonionic foaming agent, demulsifier, weighting agent, inert solid, fluid loss control agent, emulsifier, dispersion aid, emulsion thinner, emulsion thickener, lost circulation material, pH control additive, biocide, solvent, oxidizer, reducer, acid, and any combinations thereof, and
contacting the subterranean formation with the treatment.

11. The method of claim 10, wherein the measuring the geomechanical properties of the formation material comprises measuring at least one of the mineral hardness, Young's modulus, Poisson's ratio, fracture toughness, tensile strength, minimum horizontal stress, shear modulus, or the bulk modulus of the formation material.

12. The method of claim 10, wherein the measuring the geomechanical properties of the formation material comprises performing nanoindentation on the formation material.

13. The method of claim 10, wherein the measuring the mineralogy of the formation material comprises performing a nanoindentation test, a Brinell hardness test, a Young's modulus test, a Poison's ratio test, a Brazilian hardness test, a tensile test, a triaxial or uniaxial test, a compressive strength test, a fracture toughness test, an ultrasonic velocity test, a proppant embedment test, an impact hammer test, or a crush test on the formation material.

14. The method of claim 10, wherein the selected treatment comprises a treatment selected from the group consisting of potassium chloride, sodium chloride, ammonium chloride, tetramethyl ammonium chloride, cationic polymers, cationic surfactants, hydrophobic resins, transition metals, furfuryl alcohols, ethylene glycol, quaternary amines, bisquaternary amines, galactose, mannose, glucoside, glucose, xylose, arabinose, fructose, glucuronic acid, pyranosyl sulfate, xanthan gum, guar gum, hydroxypropyl guar, carboxymethylhydroxypropyl guar, hydroxyethyl cellulose, polyacrylate, polymethacrylate, polyacrylamide, polyvinyl alcohol, polyvinylpyrrolidone, borate compounds, alkaline earth metal borates, alkali metal-alkaline earth borates, zirconium compounds, zirconium lactate, zirconium lactate triethanolamine, zirconium carbonate, zirconium acetylacetonate, zirconium malate, zirconium citrate, zirconium diisopropylamine lactate, titanium compounds, titanium lactate, titanium malate, titanium citrate, titanium ammonium lactate, titanium triethanolamine, titanium acetylacetonate, aluminum compounds, aluminum lactate, aluminum citrate, antimony compounds, chromium compounds, iron compounds, copper compounds, zinc compounds, probertite, ulexite, nobleite, frolovite, colemanite, calcined colemanite, priceite, paternoite, hydroboracite, kaliborite, betaines, sulfated or sulfonated alkoxylates, alkyl quaternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates, sodium dodecane sulfonate, trimethyl hexadecyl ammonium bromide, derivatives thereof, and any combinations thereof.

15. The method of claim 10, wherein the formation material comprises a material selected from the group consisting of montmorillonite, bentonite, saponite, nontronite, hectorite, beidellite, sauconite, kaolinite, nacrite, dickite, endellite, halloysite, hydrobiotite, glauconite, illite, chlorite, greenalite, chamosite, vermiculite, palygorskite, sepiolite, zeolites, quartz, calcite, dolomite, aragonite pyrite and iron sulfide phases, feldspar, opal, cristobalite, biotite, clinoptilite, gypsum, anhydrite and any combination thereof.

16. A system for treating a subterranean formation, the system comprising:
a formation material,
a three-level physically-based predictive model for the formation material, wherein the predictive model analyzes production over time for a plurality of treatments for the formation material based by determining from the predictive model the damage to the formation material and selecting the treatment from the plurality that induces the least damage, wherein the predictive model predicts a treatment's effect on productivity over time at the reservoir scale by simulating production over time for a well based on the determination of the mineralogy and the mineral properties of the subterranean formation, wherein the formation material is treated with each treatment in the plurality of treatments and a geomechanical property and a mineralogy of the formation material are measured before and after an individual treatment to determine the degree of damage to the formation material for three distinct scales, wherein the first scale measures a millimeter and sub-millimeter range of the formation material, wherein a second scale measures a sub-micrometer range of the formation material, wherein a third scale measures a nanometer range of the formation material, wherein at least one individual treatment comprises a treatment selected from the group consisting of a clay stabilizer, cross-linkable gelling agent, cross-linker, gel breaker, viscosifier, viscoelastic surfactant, surfactant, formation consolidating agent, agglomerating agent, amphiphobic generating agent, in-situ gas and heat generating agent, in- situ acid generator, chelating agent, dewatering surfactant, oil-chisel surfactant, fines migration control agent, scale inhibitor, corrosion inhibitor, hydrate inhibitor, paraffin inhibitor, rheology modifier, catalyst, cationic foaming agent, anionic foaming agent, amphiphobic foaming agent, nonionic foaming agent, demulsifier, weighting agent, inert solid, fluid loss control agent, emulsifier, dispersion aid, emulsion thinner, emulsion thickener, lost circulation material, pH control additive, biocide, solvent, oxidizer, reducer, acid, and any combinations thereof, the plurality of treatments, and
fracturing equipment for fracturing the subterranean formation.

17. The system of claim 16, wherein the selected treatment comprises a treatment selected from the group consisting of potassium chloride, sodium chloride, ammonium chloride, tetramethyl ammonium chloride, cationic polymers, cationic surfactants, hydrophobic resins, transition metals, furfuryl alcohols, ethylene glycol, quaternary amines, bisquaternary amines, galactose, mannose, glucoside, glucose, xylose, arabinose, fructose, glucuronic acid, pyranosyl sulfate, xanthan gum, guar gum, hydroxypropyl guar, carboxymethylhydroxypropyl guar, hydroxyethyl cellulose, polyacrylate, polymethacrylate, polyacrylamide, polyvinyl alcohol, polyvinylpyrrolidone, borate compounds, alkaline earth metal borates, alkali metal-alkaline earth borates, zirconium compounds, zirconium lactate, zirconium lactate triethanolamine, zirconium carbonate, zirconium acetylacetonate, zirconium malate, zirconium citrate, zirconium diisopropylamine lactate, titanium compounds, titanium lactate, titanium malate, titanium citrate, titanium ammonium lactate, titanium triethanolamine, titanium acetylacetonate, aluminum compounds, aluminum lactate, aluminum citrate, antimony compounds, chromium compounds, iron compounds, copper compounds, zinc compounds, probertite, ulexite, nobleite, frolovite, colemanite, calcined colemanite, priceite, paternoite, hydroboracite, kaliborite, betaines, sulfated or sulfonated alkoxylates, alkyl quaternary amines, alkoxylated linear alcohols, alkyl sulfonates, alkyl aryl sulfonates, C10-C20 alkyldiphenyl ether sulfonates, polyethylene glycols, ethers of alkylated phenol, sodium dodecylsulfate, alpha olefin sulfonates, sodium dodecane sulfonate, trimethyl hexadecyl ammonium bromide, derivatives thereof, and any combinations thereof.

18. The system of claim 16, wherein the formation material comprises a material selected from the group consisting of montmorillonite, bentonite, saponite, nontronite, hectorite, beidellite, sauconite, kaolinite, nacrite, dickite, endellite, halloysite, hydrobiotite, glauconite, illite, chlorite, greenalite, chamosite, vermiculite, palygorskite, sepiolite, zeolites, quartz, calcite, dolomite, aragonite pyrite and iron sulfide phases, feldspar, opal, cristobalite, biotite, clinoptilite, gypsum, anhydrite and any combination thereof.

19. The system of claim 16, wherein the formation material is obtained from a core, cutting, or outcrop.

20. The system of claim 16, wherein the measured geomechanical properties of the formation material comprise mineral hardness, Young's modulus, Poisson's ratio, fracture toughness, tensile strength, minimum horizontal stress, shear modulus, or the bulk modulus of the formation material.

* * * * *